June 29, 1965   J. FLEISCHER   3,191,289
METHOD OF MAKING A TAPERED TUBULAR MEMBER
OF FLEXIBLE METALLIC FOIL
Filed Dec. 16, 1960
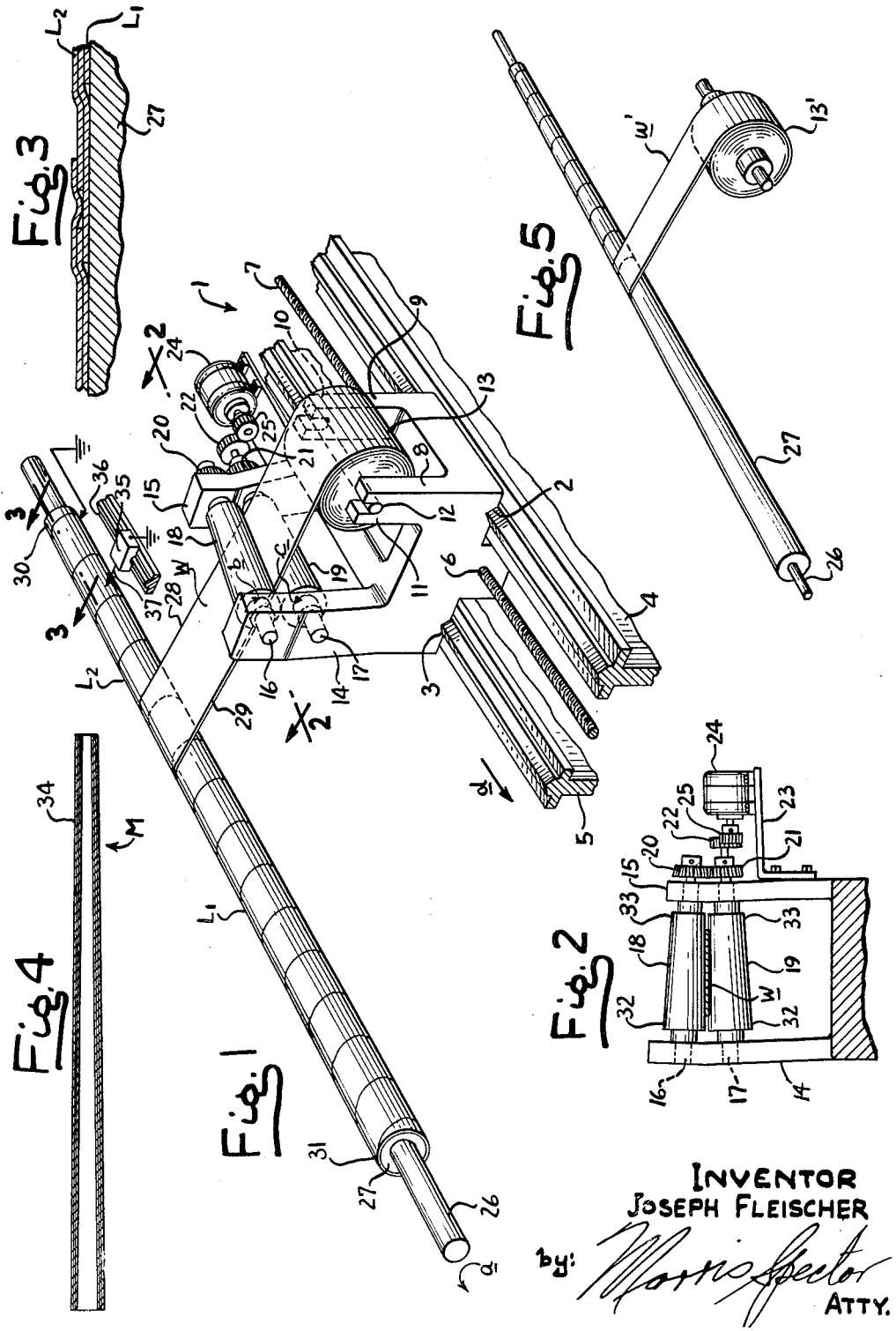
INVENTOR
JOSEPH FLEISCHER
by: Morris Spector
ATTY.

United States Patent Office 3,191,289
Patented June 29, 1965

3,191,289
METHOD OF MAKING A TAPERED TUBULAR MEMBER OF FLEXIBLE METALLIC FOIL
Joseph Fleischer, 2511 W. Fargo Ave., Chicago, Ill.
Filed Dec. 16, 1960, Ser. No. 76,396
2 Claims. (Cl. 29—473.3)

This invention relates to laminated tubular members and methods of making same.

It is an object of the present invention to provide a laminated tubular member formed by flexible metallic foil tightly wound so that the laminations constitute the body of the member and form a relatively rigid and structurally strong member.

It is another object of the present invention to provide a tapered tubular member which is relatively long in comparison with its largest diameter portion and is of a type particularly suitable for use as a flag pole or street lighting mast.

It is also an important object of the present invention to provide a tapered tubular member of the type stated in which the strip of material is elongated beyond the elastic limits in such a direction that it may form a tapered layer and the several layers will lie substantially conformably upon one another.

It is a further object of the present invention to provide a method of making laminated tubular members such as pipes, which permits fabrication in a rapid and efficient manner and by equipment that can readily be moved to the site where the members are to be used.

It is an additional object of the present invention to provide a method of the type stated in which a plurality of the strips are successively wound upon a mandrel and the strips are stretched in accordance with the taper on the mandrel prior to winding of the strips thereon, whereby the strips will form laminated layers having the same taper.

It is still another object of the present invention to provide a method of the type stated which permits tapered tubular members to be made in many desired lengths and wall thicknesses from the same stock material.

The attainment of the above and further objects of the present invention will be apparent from the following specification taken in conjunction with the accompanying drawing forming a part thereof.

In the drawing:

FIG. 1 is a fragmentary perspective view showing the method of making a laminated tapered tubular member embodying the present invention;

FIG. 2 is a fragmentary sectional view taken along line 2—2 of FIG. 1;

FIG. 3 is a fragmentary sectional view on an enlarged scale taken along lines 3—3 of FIG. 1;

FIG. 4 is a longitudinal sectional view of a completed laminated tapered tubular member constructed in accordance with and embodying the present invention; and FIG. 5 is a fragmentary perspective view showing a modified form of the present invention.

Referring now in more detail and by reference characters to the drawing which illustrates preferred embodiments of the present invention, 1 designates a carriage having spaced parallel downwardly presented grooves 2, 3 for receiving spaced parallel rails 4, 5 so that the carriage 1 is shiftable back and forth along the rails 4, 5. Also formed in the carriage 1 intermediate the grooves 2, 3 and extending parallel thereto is a threaded bore 6 for receiving a lead screw 7. The carriage 1 also has spaced upwardly extending arms 8, 9 the upper ends of which have trunnions 10, 11 which rotatably support the ends of a supply roll shaft 12. Coiled around the shaft 12 is a supply roll 13 of metallic foil, such as aluminum foil.

Spaced forward from the supply roll 13 are upstanding arms 14, 15 which rotatably support roller shafts 16, 17 upon which are mounted identical frusto-conical rollers 18, 19. Mounted on one end of each of the shafts 16, 17 are meshing bevel gears 20, 21 and the shaft 17 extends a short distance outwardly beyond the gear 21 and has mounted thereon an idler gear 22. Bolted or otherwise rigidly secured to the arm 15 is a bracket 23 which supports an electric motor 24 having a gear 25 on the shaft thereof, the gear 25 meshing with the idler gear 22 so as to drive the rollers 18, 19 in unison. Rotatably mounted in spaced parallel relation to the rails 4, 5 is a mandrel 26, preferably of wood or plastic and having a diametrally enlarged tapered portion 17, the taper being identical with and in the same direction as the taper of each of the rollers 18, 19.

In connection with the present invention it will be understood that the various bearings, motor drive for rotating the mandrel 26, and lead screw 7, as well as suitable controls therefor, are conventional and are, therefore, not shown or described in detail herein. Suffice it to say that the mandrel 26 is rotated in the direction of the arrow $a$ while the rollers 18, 19 are respectively rotated in the directions of the arrows $b$, $c$. Rotation of the lead screw 7 will cause the carriage 1 to move along the rails 4, 5 and parallel to the longitudinal axis of the mandrel 26.

In accordance with the process of the present invention a web $w$ of metallic foil, of, for instance, aluminum or steel, having parallel longitudinal edges 28, 29 is withdrawn from the supply roll 13 and passed between the rollers 18, 19. At this time the carriage 1 is opposite the narrow end 30 of the tapered portion 27 of the mandrel and a sufficient length of the web $w$ is withdrawn from the supply roll 13 so that one complete wrap around the tapered portion 27 at the end 30 thereof can be made. This first wrap may be completed by lightly cementing or tack-welding the free end of the web to the web itself to hold the wrap temporarily in place. Thereafter, the mandrel 26 is rotated and the carriage 1 moved along the rails 4, 5 in the direction of the arrow $d$ while at the same time the rotating motor 24 drives the rollers 18, 19 to feed the web $w$ on to the tapered portion 27 of mandrel until the longitudinal edge 29 of the web $w$ is at the larger diameter end 31 of the tapered portion 27, whereupon the web $w$ is cut transversely thereof. This free end may then be temporarily cemented or tack welded in place to complete the first layer $L_1$.

As the tapered rollers 18, 19 rotate, it will be apparent that the peripheral speed at the larger diameter ends 32 thereof will be greater than the peripheral small diameter ends 33. The peripheral speed will be increasing uniformly from the smaller diameter ends to the larger diameter ends, and since the web $w$ is fed between the rollers 18, 19 the peripheral speed at each point on the web from one longitudinal edge 28 to the other edge 29 will progressively increase from the small diameter ends 33 to the larger diameter ends 32. As a result, the web $w$ will be stretched beyond its elastic limit with the amount of stretch or elongation increasing uniformly from the longitudinal edge 28 to the edge 29 and with substantially no elongation at the edge 28. Furthermore, since the taper of the rollers 18, 19 is the same as the taper on the mandrel portion 27, the gradient of elongation across the web $w$ will be equal to the taper of the portion 27. Therefore, as the web $w$ is wrapped around the tapered portion 27, it will lie substantially conformably thereagainst since each wrap or wind of the web will have an outer frusto-conical shape which is substantially the same as that of the tapered portion 27.

The web is easily stretched beyond its elastic limit since the thickness of the metal is quite thin, preferably of the order of .005 to .010 inch. Furthermore, the amount of elongation at the edge 29 need be relatively small since the web $w$ may be in the order of six inches in width while the tapered portion 27 of the mandrel may be slight. For example, the tapered portion 27 may be four inches at its smaller diameter 30 and eight inches at its larger diameter end 31, while the overall length of the tapered portion 27 might be of the order of thirty feet. The web $w$ undergoes no further stretching other than that hereinbefore described since the speed of travel of the carriage 1 is adjusted so that each successive wind or wrap of the web $w$ around the mandrel will overlap a portion of the preceding wrap as shown in FIG. 3.

The next layer $L_2$ of metallic foil is applied over the first layer $L_1$ in the aforementioned manner except that the second layer $L_2$ may be started by cementing or tack-welding the free end of the web directly to the layer $L_1$ at the end 30. Additional layers are applied like the layer $L_2$. After the desired number of layers of metallic foil have built up to form the laminated wall 34 of the hollow tapered tubular member M, the mandrel 26 may be rotated and a welder 35 advanced along its track 36 from one end of the mandrel to the other, to weld the several layers $L_1$, $L_2$, etc. together. This welder 35 has an electrode 37 which contacts the outer surface of the outer layer of the metallic foil of the wall 34. The other electrode may consist of the metallic foil itself which is grounded as shown in FIG. 1. After the welding has been completed, the member M is separated from the mandrel 26 and will appear in longitudinal cross section as shown in FIG. 4, and will have a uniform taper the same as that of the portion 27. In lieu of welding it is also possible to apply a coating of a suitable non-corrosive, metal-to-metal adhesive on the outer surface of each layer $L_1$, $L_2$, etc. prior to winding the next layer thereover, so that in the finished hollow tubular member M, adhesive will be between each of the layers and provide a firm bond therebetween.

The member M can be made strong and rigid by building up a requisite number of layers of metallic foil forming the wall 34. Furthermore, by welding or cementing the layers together, the wall 34 is structurally comparable to a homogeneous wall formed by casting, extruding or the like. In addition, shorter or longer mandrels having the same taper may be used to form members M of different lengths without changing the rollers 18, 19. On the other hand, if a mandrel of different taper is used, it is necessary to use other rollers 18, 19 having the same taper as that of the mandrel.

It is also possible to provide a modified form of method of making the hollow tapered tubular member as shown in FIG. 5. In this form of the invention the several layers of metallic foil are wrapped around the mandrel in the same manner as previously described, except that the supply roll 13' has coiled thereon metallic foil which has been prestretched in accordance with the taper of the tapered portion 27 of the mandrel. The roll 13' will thus appear as the frustum of a cone. Consequently, the web $w'$ can be withdrawn from the supply roll 13' and wrapped around the mandrel without the necessity of passing through stretching rollers 18, 19.

If desired, the rollers 18, 19 may have parallel shafts 16, 17 and be cylindrical rather than frusto-conical, as shown, and the motor 24 eliminated. In place of the motor 24 a suitable conventional brake may be used whereby the rollers serve as an ordinary tensioning means to hold the web $w$ taut as it is wound upon the power driven mandrel 26. The web $w$ being relatively thin, will undergo progressive elongation or stretch from one edge 28 to the other 29 as it is wrapped around the mandrel to conform to the tapered part 27 thereof. Some slight amount of creasing or wrinkling of the web may occur as the layers $L_1$, $L_2$, etc. are applied to the mandrel. However, this need not be objectionable since the taper on the mandrel is small and any creasing will be correspondingly small. After the last layer has been applied, any creases appearing on the surface may be ground or otherwise machined off and the member M may be polished to give it a neat appearance. The outer layers will not tend to unravel even if one or more layers is cut through during the machining operation because of the adhesive or weld between the layers.

If desired the tubular object to be made may have no taper whatsoever, as in the case of a "pipe." The mandrel 26 would then be a non-tapered mandrel.

While two metallic tape materials have been designated it is within the purview of the present invention to use tape of any other materials, or a combination of tapes of different materials. For instance, the inner layers of tape may be of one material as required by the nature of the liquid that may flow through the pipe, and the outermost layer or layers may be of another material as required for the particular location for the pipe, as for instance, to resist corrosion or electrolytic action in the earth. Also, the inner and outer tape layers may be of different materials as is determined, for instance, by desired economies in construction. The inner layer or layers may be of plastic tape in the case of a pipe or a tapered mast, to the desired thickness, and the outer layer or layers may be of metal which may be of one or more layers to provide a covering as necessary or desirable either for strength or for protection, or for appearance.

In the fabrication of an object made in accordance with the present invention each layer comprises a sheath of foil tape, generally metal tape. The sheaths are laminated together. A protective covering film may be painted on or otherwise applied to some layer or layers prior to the application of the next tape layer. This protective film that is interposed between the laminations of tape may serve for adhesive purposes to adhere the superposed layers, or to prevent continued corrosive penetration should some chemical corrosion or other chemical action react with and destroy or make pin holes in the surrounding layer (or in the innermost layer).

Transportation charges for large diameter pipes can become quite expensive. By the present invention such pipe may be made at or near the site where it is to be used, thus saving the large shipping expenses. The equipment required for the fabrication of such pipe can readily be transferred to the site where the pipe is to be used.

Pipe of iron or other metal, particularly pipe of the type that is to be buried in the ground, such as, for instance, water pipe, large sewer pipe, etc., is frequently protected against corrosion or electrolytic action by the application of a thin coating of plastic material on the outside of the pipe. In order to be effective, this coat must not be broken. Due to its thinness or other fragile qualities by reason of the nature of the plastic, it may be subject to chipping or peeling or ripping during handling of the pipe in transit or in installation. To avoid this, the principles of the present invention may be utilized by covering the outside of a conventional metal pipe with one or more layers of metal or foil tape, such as aluminum or stainless steel tape, in the manner hereinabove discussed. The tape acts as a protective covering for the plastic. Any deterioration of the tape under electrolytic action, after the pipe has been installed underground, is of no great concern, since the plastic is then not being subjected to any mechanical action which might thereafter chip it, and it protects the underlying pipe structure. Pipe of this type is frequently connected underground by a connecting material which may be electrically insulating. This reduces or eliminates the use of the pipe as part of an electric circuit, as, for instance, for electrolytic protection, or even for electric communication. If the pipe is covered with a layer of metallic tape as above described, it is an easy matter after the pipe is laid to connect adjacent joined pipe sections with an electrically conductive jumper, to insure the electrical continuity of the entire pipe line. This electrical continuity is not substantially affected by deterioration of parts of the metal foil on the outside of the pipe after installation thereof.

As previously pointed out, the member M may be constructed of such length and wall thickness as to be used as a flagpole or street lighting mast. In the case of a street lighting mast, the lower or widest diameter end of the member M is supported on the ground and near the upper end a mast arm may be mounted which, in turn, carries a lighting fixture. The electric cable for the lighting fixture extends from the ground upwardly within the mast or member M.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and desired to be secured by Letters Patent is:

1. A method of making a tapered tubular member, said method comprising feeding a first strip of material through cooperating rollers and driving the rollers to grip and elongate said first strip lengthwise thereof beyond its elastic limit with the amount of elongation uniformly increasing from one longitudinal edge to the other, and after effecting said elongation wrapping said first strip a plurality of times about a mandrel having a taper equal to the gradient of elongation between said longitudinal edges and with each successive wrap partially overlapping the preceding wrap and the strip having a width which is a minor fractional part of the length of said mandrel, elongating a second strip of material lengthwise thereof to the same extent as the elongation of said first strip, thereafter wrapping said second strip over the first strip with each successive wrap thereof partially overlapping the preceding wrap, repeating the elongation and wrapping until the desired thickness of the wall of the tubular member is obtained, securing the strips together at their interfaces and thereafter separating the tubular member thus formed from the mandrel.

2. A method of making a laminaated tapered tubular member, said method comprising longitudinally passing a web of metallic foil between tapered rollers that grip the web and cause the peripheral speed of the web to increase uniformly from one longitudinal edge thereof to the other to stretch the web beyond its elastic limit in a uniformly increasing gradient from one longitudinal edge of the web to the other, and thereafter wrapping the elongated web around a mandrel having an outer surface tapered in an amount corresponding to the gradient of elongation of the web and with the adjacent turns of the web overlapping, severing the web after completion of the wrapping and securing the severed end of the web to an adjacent turn of the web, repeating the stretching and wrapping of successive webs until the laminated wall of the member reaches a desired thickness, securing the wrapped webs together, and separating the tubular member thus formed from the mandrel.

References Cited by the Examiner
UNITED STATES PATENTS

| | | | |
|---|---|---|---|
| 1,665,585 | 4/28 | Esch. | |
| 1,795,876 | 3/31 | McCoy. | |
| 1,809,984 | 6/31 | Mains | 154—129 |
| 1,921,516 | 8/33 | Frederick. | |
| 1,990,248 | 2/35 | Parker | 138—144 |
| 2,008,423 | 7/35 | Ritchie | 113—35 |
| 2,048,360 | 7/36 | Spanel et al. | 93—80 |
| 2,100,307 | 11/37 | McMinn | 29—477.3 |
| 2,250,430 | 7/41 | Wade | 93—80 |
| 2,316,349 | 4/43 | McMinn | 138—154 |
| 2,768,921 | 10/56 | Pigg | 154—91 |
| 2,861,598 | 11/58 | Carder et al. | 154—129 |
| 2,882,083 | 4/59 | Palumbo | 138—133 |
| 2,948,200 | 8/60 | Westerbarkey | 93—80 |
| 2,998,339 | 8/61 | Barnes et al. | |

FOREIGN PATENTS 442,352  2/36  Great Britain.

EARL M. BERGERT, *Primary Examiner.*

CARL F. KRAFFT, *Examiner.*